(12) United States Patent
Okuhama et al.

(10) Patent No.: US 6,183,545 B1
(45) Date of Patent: Feb. 6, 2001

(54) AQUEOUS SOLUTIONS FOR OBTAINING METALS BY REDUCTIVE DEPOSITION

(75) Inventors: Yoshiaki Okuhama; Takao Takeuchi; Masakazu Yoshimoto; Shigeru Takatani; Emiko Tanaka; Masayuki Nishino; Yuji Kato; Yasuhito Kohashi; Kyoko Kuba; Tetsuya Kondo; Keiji Shiomi; Keigo Obata, all of Akashi; Mitsuo Komatsu, Ibaraki; Hidemi Nawafune, Takatsuki, all of (JP)

(73) Assignee: Daiwa Fine Chemicals Co., Ltd., Hyogo-ken (JP)

( * ) Notice: Under 35 U.S.C. 154(b), the term of this patent shall be extended for 0 days.

(21) Appl. No.: 09/340,894

(22) Filed: Jun. 28, 1999

(30) Foreign Application Priority Data

Jul. 14, 1998 (JP) .................................................. 10-198763

(51) Int. Cl.[7] ............................ C23C 18/31; C23C 18/32; C23C 18/38; C23C 18/42; C23C 18/48; C23C 18/50; C23C 18/54; C23C 3/20; C23C 3/22; C23C 3/26; C23C 3/30; C23C 3/36; C23C 3/38; C23C 3/46; C23C 3/48; C23C 3/52; C23C 3/54; C23C 3/56; C25D 3/10; C25D 3/12

(52) U.S. Cl. ...................... 106/1.18; 106/1.19; 106/1.21; 106/1.22; 106/1.23; 106/1.24; 106/1.25; 106/1.26; 106/1.27; 106/1.28; 106/1.29; 205/239; 205/240; 205/241; 205/242; 205/243; 205/244; 205/245; 205/246; 205/247; 205/250; 205/251; 205/253; 205/258; 205/259; 205/262; 205/263; 205/264; 205/265; 205/267; 205/269; 205/270; 205/271; 205/281; 205/290; 205/296; 205/299; 205/302; 205/311; 205/315

(58) Field of Search ................................... 106/1.18–1.29; 205/239–247, 250, 251, 253, 258, 259, 262–265, 267, 269–271, 281, 290, 296, 299, 302, 311, 315

(56) References Cited

U.S. PATENT DOCUMENTS

| | | | | |
|---|---|---|---|---|
| 3,622,367 | * | 11/1971 | Haag et al. | 427/212 |
| 3,629,922 | * | 12/1971 | Miller et al. | 205/169 |
| 3,635,761 | * | 1/1972 | Haag et al. | 106/1.22 |
| 3,681,511 | * | 8/1972 | Miller | 106/1.26 |
| 4,795,538 | | 1/1989 | Caude et al. | 205/566 |
| 4,830,880 | * | 5/1989 | Okubi et al. | 427/229 |
| 5,679,237 | | 10/1997 | Chamard et al. | 205/420 |

FOREIGN PATENT DOCUMENTS

| | | |
|---|---|---|
| 63-259093 | 10/1988 | (JP) . |
| 8-225985 | 9/1996 | (JP) . |
| 8-257418 | 10/1996 | (JP) . |

* cited by examiner

*Primary Examiner*—Helene Klemanski
(74) *Attorney, Agent, or Firm*—Akin, Gump, Strauss, Hauer & Feld, L.L.C.

(57) ABSTRACT

An aqueous solution for the reductive deposition of metals comprising, besides water, (A) a phosphine of the general formula (1)

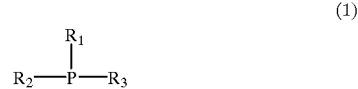

(1)

in which $R_1$, $R_2$, and $R_3$ denote lower alkyl groups, at least one of which being hydroxy-or amino-substituted lower alkyl group, and (B) a soluble compound of a metal or a compound of a metal solubilized through the formation of a soluble complex by said phosphine.

12 Claims, No Drawings

AQUEOUS SOLUTIONS FOR OBTAINING METALS BY REDUCTIVE DEPOSITION

BACKGROUND OF THE INVENTION

1. Field of the Invention

This invention relates to a technique for depositing metals from their aqueous solutions by reduction and, more particularly, to electroplating, electroless plating, manufacture of fine metal particles, and/or recovery of metals.

2. Description of the Prior Art

Techniques for obtaining metals by reductive deposition from the solutions in which the metals are dissolved in the form of ions (simple ions and complexes) are in use for refining and recovery of metals, plating, and manufacture of fine metal particles and so on. In the area of those techniques, the development of new process starts with the preparation of a solution capable of dissolving an objective metal as ions and sustaining operation for long. The simplest practice at the start is dissolving a soluble salt of the metal. For this purpose various salts such as sulfate, chloride, nitrate, sulfonate, borofluoride, sulfamate, phosphate and so on have been employed. Where such a simple salt is not soluble or can seldom form a solution capable of yielding a metal coating or metal particles with satisfactory physical properties, a complex, instead of simple ions, is used in preparing a solution. Cyanide is deemed typical of the complexing agents that have long been used in providing stable solutions. Complexes have found use in other diversified applications. When alloy coatings or alloy particles are to be obtained, a complex is utilized to bring the deposition potentials of two or more metals close to one another so as to make an alloy of desired composition. A complex controls the balance between the nucleation at the time of metal deposition and the growth of crystals from the nuclei to afford a metal or alloy of intended physical properties. These modern applications have combined with the trend for restricting the use of cyanide because of its environmental hazard to encourage the development and utilization of various complexing agents suited for the diversified applications. Examples of complexing agents abound; inorganic complexing agents including halogens such as iodide ion and bromide ion, condensed phosphate complexing agents such as pyrophosphate ion and tripolyphosphate ion, oxyacid ions of sulfur such as thiosulfate ion and sulfite ion; and organic complexing agents including carboxylic or oxycarboxylic acid ones such as citric, tartaric, and gluconic acids, aminecarboxylate ones such as EDTA, DTPA, IDA, and NTA, and compounds containing nitrogen or sulfur or both such as urea, thiourea, succinimide, hydantoin, and various mercaptocarboxylic acids.

These varied complexing agents may be used singly or in combination to prepare aqueous solutions for the reductive deposition of metals. However, many of the resulting solutions are still unsatisfactory from the industrial viewpoint, not merely in achieving the above purpose, or stabilization of the bath, but also in the control of deposition potential, crystal growth, and other factors. As regards electroplating and electroless plating of gold, for example, it has been proposed and adopted in some sector of the industry to use sulfurous acid, thiosulfuric acid, mercapto-carboxylic acids, etc. so as to prepare cyanide-free plating baths. The disadvantages of the proposed attempts are short bath life and the possibility of contamination of sulfur in the plating deposits. Some attempts have also been made to add a slight amount of nickel, cobalt, antimony, tin or other similar metal to the plating solution so that codeposition can enhance the hardness of the gold plate. Nevertheless, the addition of such a metallic element results in weaker stability of the solution. In electroplating of silver too, there is a demand for cyanide-free baths, and solutions using iodine, succinimide, or the like as a complexing agent have met partial commercial acceptance. Here again the stability, adhesion, and other problems of the baths have hampered the widespread adoption of such solutions. In electroless plating of palladium, ammine complexes are used in the plating solutions, but the baths have a stability problem. Further, for the electroplating of silverpalladium alloy that exhibits outstanding electrical characteristics, research has been made on the use of a variety of complexing agents including ammonia, nitrite, ethylenediamine, pyrophosphate, glycine, halogens, and thiocyanate. No industrially satisfactory solution has, however, been developed yet which can find wide acceptance. Silver-tin alloy coating has been deemed promising because of the favorable contact electric resistance characteristics and resistance to tarnishing inherent to silver. Nevertheless, it has not come into extensive industrial use since the wide discrepancy between the deposition potentials of the two metals presents difficulties in developing a solution with excellent stability and ability of easily forming a coating of desirable composition.

In order to settle the principal problem of providing a stable solution and then settle various concomitant problems, e.g., Japanese Patent Publn Kokai No. 63-259093 discloses the utilization of sulfonated phosphine in a solution for recovering rhodium electrolytically. Patent Publn Kokai No. 8-257418 employs sulfonated phosphine in an electrochemical process for producing a catalyst composed mainly of a transition metal and phosphine. Patent Publn. Kokai No. 8-225985 teaches the use of lower alkyl phosphines, cycloalkylphosphines, triphenylphosphine, and other phosphines, alkyl phosphonic acids, hydroxyalkane diphosphonic acids and the like to restrict the displacement deposition of bismuth as well as the variation in the bismuth content in the deposit from a bismuth-tin alloy plating bath.

However, the lower alkyl, cycloalkyl, phenyl phosphines and the like taught in Patent Publn Kokai No. 8-225985 are not, in essence, water soluble and present tremendous difficulties in use at the concentrations in the range of 1–500 g/l as explained in the specification for the application. In addition, the introduction of sulfonic acid group to impart water solubility makes the sulfonated aryl phosphine so expensive that the industrial application for the plating bath is limited to particularly high-priced metals such as rhodium.

BRIEF SUMMARY OF THE INVENTION

The present inventors have intensively searched for a solution of the afore-described problems of complexing agents to be used in the aqueous solutions for the reductive deposition of metals. As a result it has now been found that the hydroxy- or amino-substituted alkyl-containing phosphine in which one hydrogen in the alkyl group of alkyl phosphine has been substituted by —OH or —NH$_2$ can be produced at lower cost than sulfonated aryl phosphine and can readily dissolve in water, rendering it quite easy to prepare an aqueous solution of a high concentration and that the particular phosphine emits only a slight odor compared to other phosphines, is harmless as evidenced by the adoption as a chemical for permanent waving, forms complexes with noble metals and many other metals to provide highly stable solutions, and permits the formation of good plated coatings of singular metal and/or alloy or the formation of fine particles. The discovery has thus settled the problems of the prior art.

Briefly stated, the invention resides in an aqueous solution for the reductive deposition of metals characterized in that it contains (A) a phosphine of the general formula (1)

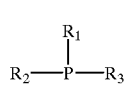

$$R_2\text{---}\overset{R_1}{\underset{}{P}}\text{---}R_3 \tag{1}$$

in which $R_1$, $R_2$, and $R_3$ denote lower alkyl groups, at least one of which being hydroxy- or amino-substituted lower alkyl group, and (B) a soluble compound of a metal or a compound of a metal solubilized through the formation of a soluble complex with said phosphine.

DETAILED DESCRIPTION OF THE INVENTION

The aqueous solution for use in the reductive deposition of metals in accordance with the invention is easily prepared by dissolving a hydroxy- or amino-substituted alkyl-containing phosphine and a soluble compound of a metal or a compound of a metal solubilized through the formation of a soluble complex with the phosphine.

The phosphine represented by the formula (1) is such that at least one of $R_1$, $R_2$, and $R_3$ contains a hydroxy- or amino-substituted lower alkyl group. Particularly desirable is a phosphine in which all of $R_1$, $R_2$, and $R_3$ are hydroxy- or amino-substituted lower alkyl groups, or a tris(hydroxy- or amino-substituted lower alkyl) phosphine. As for the lower alkyl groups, suitable for use are methyl, ethyl, propyl, iso-propyl, butyl, sec-butyl, tert-butyl, pentyl and the like. Of these, methyl, ethyl, and propyl are preferred, and propyl is more preferred. The hydroxy or amino group may substitute at any desired point of the alkyl group. Preferred phosphines are tris(hydroxymethyl)phosphine, tris(2-hydroxyethyl)phosphine, tris(3-hydroxypropyl)phosphine, and tris(3-aminopropyl)phosphine. Of these, tris(3-hydroxypropyl) phosphine is more preferable.

The phosphines of the formula (1) that may be used under the invention are known in the art and is easily available or can be produced in conformity with the process described in the literature, e.g., in the publication *Inorg. Chem.*, 1992, 31, p.3026, or *Inorganica Chimica Acta*, 217(1994), p.201.

The concentration of the phosphine that is used in an aqueous solution for the reductive deposition of metals in accordance with the invention may be suitably changed depending on the concentration of the objective metal, the intended use of the solution, and the operating conditions. In general, the concentration is one to 10000 times that of the metal to be complexed with the phosphine in the solution. Where the solution is used for the purpose of electroplating or electroless plating, a concentration about one to 300 times is more desirably used. When the extraction and recovery by reductive deposition of a noble metal is aimed at, the concentration in the solution is between 100 and 10000 times where the metal is very small in quantity, between 100 and 1000 times in ordinary operation, and between 10 and 500 times where the metal concentration is relatively high.

An aqueous solution according to the invention for the reductive deposition of metals contains one or two or more types of metals selected from the group consisting of copper, silver, gold, zinc, cadmium, indium, germanium, tin, lead, arsenic, antimony, bismuth, chromium, molybdenum, manganese, iron, cobalt, nickel, ruthenium, rhodium, palladium, osmium, iridium, and platinum. Where codeposition with such a metal or metals is desired, the solution may further contain one or two or more compounds containing phosphorus, boron, or tungsten.

The above-mentioned metals to be used in an aqueous solution of the invention for the reductive deposition of metals are either water-soluble compounds or compounds of the metals that are solubilized through the formation of water-soluble complexes by the phosphine. For this purpose any of known compounds may be employed. They include halides, such as chlorides, bromides, and fluorides, of the metals; salts and complexes of the metals with ions of sulfate, sulfite, thiosulfate, nitrate, nitrite, thiocyanate, carboxylate or oxy-carboxylate such as acetate, citrate, tartrate, oxalate, and gluconate, aliphatic and aromatic sulfonates, halogenated alkyl sulfonates, thiocarboxylate, amino acids, thioaminoacids, aminecarboxylate such as EDTA, ethylenediamine, and ammonia; salts of the metals with oxygen acid; and oxides of the metals.

The aqueous solution of the invention for the reductive deposition of metals is used as a solution for electroplating or for the recovery of metals, through which a current is passed for the electrochemical reduction of metal ions in the solution. Alternatively it is utilized as an electroless plating bath or for the manufacture of fine metal particles through chemical reduction by the action of a reducing agent dissolved in the solution. Displacement electroless plating bath in which a metal ion in the solution is reduced and deposited by means of the difference of ionization tendency with a base metal also comes within the contemplation of the invention.

Phosphorus, boron, or tungsten cannot be used singly. However, phosphorus or boron in the form of a compound containing either element can be used with an aqueous solution of the invention for the reductive deposition of a metal, so that either element can be deposited as an alloy with the particular metal by electroplating or electroless plating. Likewise, a compound containing tungsten may be used with iron, cobalt, or nickel to deposit an alloy with such a metal by electroplating.

The amount of the metal or metals to be used may vary suitably with the intended purpose of the solution. In general, for applications as plating baths, the amount is between 0.1 and 100 g/l, and for the metal recovery from the solution, the amount at the stage of reductive deposition is the same as that for a plating solution, i.e., between 0.1 and 100 g/l, but at the stage before concentration, it may be on the order of parts per billion of the solution.

The aqueous solution of the invention for the reductive deposition of metals may contain, depending on its intended use, any of known reducing agents, surfactants, smoothening agents, semi-brighteners, brighteners, stabilizing auxiliary complexing agents, masking complexing agents, pH buffers, conductive salts and/or any of antioxidants or other additives.

The compounds that can be suitably used as reducing agent in the use of the solution of the invention for electroless plating are selected depending on the purpose from the known reducing agents such as borohydride, dimethylamine borane, trimethylamine borane, hydrazine borane, hydrazine, hydroxylamine, phosphinic acid, thiourea, formaldehyde, formic acid, glyoxylic acid, glyoxal, glucose, sorbitol, dextrin, tartaricacid, ascorbicacid, trivalent titanium ion, and/or divalent cobalt ion (all inclusive of their salts).

The compounds that can be suitably used as surfactants are the cationic, anionic, nonionic, and amphoteric surfactants usually used in plating baths. They are used singly or as a mixture as desired.

As suitable surfactants, cationic surfactants include tetra-lower alkylammonium halides, alkyltrimethylammonium halides, hydroxyethyl alkyl imidazoline, polyoxyethylene alkyl methyl ammonium halides, alkylbenzalkonium halides, dialkyldimethyl ammonium halides, alkyldimethyl benzyl ammonium halides, alkylamine hydrochlorides, alkylamine acetates, alkylamine oleates, alkylaminoethyl glycine, and alkylpyridinium halides.

Among anionic surfactants are alkyl(or formalin condensate)-β-naphthalenesulfonic acids (or their salts), fatty acid soaps, alkyl sulfonates, α-olefin sulfonates, alkylbenzenesulfonates, alkyl(or alkoxy) naphthalenesulfonates, alkyldiphenyl ether disulfonates, alkyl ether sulfonates, alkylsulfuric esters, polyoxyethylene alkyl ether sulfuric esters, polyoxyethylene alkyl phenol ether sulfuric esters, higher alcohol phosphoric monoesters, polyoxyalkylene alkyl ether phosphoric acids (phosphates), polyoxyalkylene alkyl phenyl ether phosphates, polyoxyalkylene phenyl ether phosphates, polyoxyethylene alkyl ether acetates, alkanoyl sarcosines, alkanoyl sarcosinates, alkanoyl methylalanine salts, alkyl sulfoacetates, acyl methyl taurines, alkyl fatty acid glycerin sulfuric esters, hardened coconut oil fatty acid glyceryl sulfates, alkyl sulfocarboxylic esters, alkyl sulfosuccinates, dialkyl sulfosuccinates, alkyl polyoxyethylene sulfosuccinates, and sodium (or ammonium or TEA) sulfosuccinic monooleylamides.

Nonionic surfactants are, e.g., polyoxyalkylene alkyl ethers (or esters), polyoxyalkylene phenyl (or alkylphenyl) ethers, polyoxyalkylene naphthyl (or alkylnaphthyl) ethers, polyoxyalkylene styrenated phenyl ethers (or surfactants prepared by further adding a polyoxyalkylene to the phenyl group), polyoxyalkylene bisphenol ethers, polyoxyethylene-polyoxypropylene block polymers, polyoxyalkylene sorbitan fatty acid esters, polyoxyalkylene sorbitol fatty acid esters, polyethylene glycol fatty acid esters, polyoxyalkylene glycerin fatty acid esters, polyoxyalkylene alkylamines, polyoxyalkylene condensate adducts of ethylenediamine, polyoxyalkylene alkylene fatty acid amides, polyoxyalkylene castor (or/and hardened castor) oils, polyoxyalkylene alkyl phenyl formalin condensates, glycerin (or polyglycerin) fatty acid esters, pentaerythritol fatty acid esters, sorbitan mono(sesqui, tri) fatty acid esters, higher fatty acid mono(di)ethanolamides, alkyl-alkylolamides, and oxyethylene alkylamines.

Amphoteric surfactants include 2-alkyl-N-carboxymethyl (or ethyl)-N-hydroxyethyl(or methyl) imidazolinium betaines, 2-alkyl-N-carboxymethyl(or ethyl)-N-carboxymethyloxyethyl imidazolinium betaines, dimethylalkyl betaines, N-alkyl-β-aminopropionic acids (or their sodium salts), alkyl(poly)-aminoethylglycine, N-alkyl-N-methyl-β-alanines (or their sodium salts), and fatty acid amidopropyl dimethylaminoacetic acid betaines.

The amount of such a surfactant or surfactants to be used may be suitably chosen but generally ranges from about 0.001 to about 50 g/l, preferably from 0.01 to 50 g/l.

The aqueous solution of the invention for the reductive deposition of metals by reductive deposition may contain, besides the phosphine, an auxiliary complexing agent for stabilizing the solution. It may further contain an impurity metal masking complexing agent to preclude the possibility that tiny fragments of equipment and its rust float in the operational environments, and that fine metal particles falling into the solution and also impurity metal ions, e.g., the ions of copper, nickel, and iron, that have dissolved out of the object being codeposited with the desired metal deposit or deteriorate the solution.

As the auxiliary complexing agent for stabilization or as an impurity metal masking complexing agent, the compounds usually employed as complexing agents may be properly chosen and used singly or in combination. Suitable complexing agents include oxycarboxylic acids or polycarboxylic acids (and their salts) such as glycolic, malonic, lactic, malic, tartaric, citric, and gluconic acids; thiocarboxylic acids such as acetylcysteine and mercaptosuccinic acid; amino acids and thioamino acids such as cysteine and methionine; disulfides such as dithiodianiline and dithiodipyridine, and sulfides; and thiourea and thiourea derivatives such as trimethyl thiourea and allyl thiourea.

Also useful are aminocarboxylic acids such as ethylenediaminetetraacetic acid, 1,2-diaminocyclohexane-N,N,N',N'-tetraacetic acid, 1,3-diaminohydroxypropaney-N,N,N',N'-tetraacetic acid, diethylenetriamine-N,N,N',N'',N''-pentaacetic acid, N,N-bis(2-hydroxyethyl)glycine, iminodiacetic acid, nitrilotriacetic acid, and nitrilotripropionic acid (and their salts).

The sufficient amount of the auxiliary complexing agent or impurity metal masking complexing agent to be used to stabilize the bath or achieve the above-mentioned effect is between 1 and 100 g/l, preferably between 1 and 20 g/l.

Moreover, one or two or more of pH buffers, conductive salts and/or antioxidants may be added to the solution for further stabilization of the bath or improvements in the physical properties of the coating to be obtained. Where the solution is to be employed as a bath for electroplating or electroless plating, one or two or more of known smoothening agents, semi-brighteners, and brighteners may be added to help obtain a dense plate. Here again, needless to say, any of pH buffers, antioxidants and the like may also be used.

The compounds that can be suitably used as antioxidant in the solution of the invention and the solution to be added as a supplement to the solution of the invention are selected depending on their purpose from the known antioxidants for example, monohydric, dihydric and trihydric phenols in which a hydrogen atom or atoms may be unsubstituted or substituted by —COOH, —SO3H, lower-alkyl and/or lower-alkoxy groups, such as hydroquinone, catechol, resorcinol, quinol, pyrogallol, hydroxyquinol, phloroglucinol, guaiacol, gallic acid, 3,4-dihydroxybenzoic acid, phenolsulfonic acid, cresolsulfonic acid, hydroquinonesulfonic acid, catecholsulfonic acid, tiron, and so on (all inclusive of their salts).

The aqueous solution thus far described for obtaining a metal or metals by reductive deposition in accordance with the invention is used in the reduction by current of metal ions from the aqueous solution, or electroplating; the reduction by a reducing agent of metal ions from the aqueous solution, or reductive electroless plating or the manufacture of fine metal particles or the recovery of metals; or the reduction by displacement of metal ions with a base from the aqueous solution, or displacement electroless plating. Thus the invention is applicable to the reductive deposition of a variety of metals or alloys, and is particularly suited for the reductive deposition of noble metals and their alloys for which stable and harmless solutions can hardly be prepared.

The invention is illustrated by the following several examples, which are not in any way limitative; the conditions to be used may be changed appropriately to suit the intended use and purpose without departing from the scope of the claims.

EXAMPLE 1

An aqueous solution of the following composition was prepared:

| Gold mercaptosuccinate | 10 g/l (as gold) |
|---|---|
| Tris (3-hydroxypropyl) phosphine | 100 g/l |

Using this aqueous solution, electroplating was carried out under the following conditions and a good gold plate was obtained:

| pH | 6 |
|---|---|
| Temperature | 50° C. |
| Current density | 1 A/dm$^2$ |

EXAMPLE 2

An aqueous solution of the following composition was prepared:

| Gold tris(3-hydroxypropyl) phosphine | 2 g/l (as gold) |
|---|---|
| Tris(3-hydroxypropyl) phosphine | 20 g/l |
| EDTA | 5 g/l |

Using this aqueous solution, electroless plating was conducted over an electroless nickel-phosphorus alloy plate under the following conditions and a good gold plate was obtained:

| pH | 7 |
|---|---|
| Temperature | 85° C. |

EXAMPLE 3

An aqueous solution of the following composition was prepared:

| Gold chloride | 5 g/l (as gold) |
|---|---|
| Nickel chloride | 0.1 g/l |
| Tris(3-hydroxypropyl) phosphine | 70 g/l |

Using this aqueous solution, electroplating of a gold-nickel alloy was done under the following conditions over an electroplated nickel coating, and a slightly whitish, good gold-nickel alloy plate was obtained:

| pH | 6 |
|---|---|
| Temperature | 30° C. |

EXAMPLE 4

An aqueous solution of the following composition was prepared:

| Silver methanesulfonate | 20 g/l (as silver) |
|---|---|
| Tris(3-hydroxypropyl) phosphine | 100 g/l |

Using this aqueous solution, electroplating of silver was carried out under the following conditions over a copper sheet and a good silver plate was obtained:

| pH (adjusted with methanesulfonic acid) | 0.98 |
|---|---|
| Temperature | 25° C. |
| Current density | 1 A/dm$^2$ |

EXAMPLE 5

An aqueous solution of the following composition was prepared:

| Tin methanesulfonate | 7 g/l (as divalent tin) |
|---|---|
| Silver methanesulfonate | 5 g/l (as silver) |
| Methanesulfonic acid (free acid) | 80 g/l |
| Tris(3-hydroxypropyl) phosphine | 100 g/l |

To this aqueous solution was slowly added dropwise an aqueous solution of 20% methanesulfonic acid. The reducing power of the bivalent tin helped obtain fine silver particles of less than 100 nm in diameter for catalyst use.

EXAMPLE 6

An aqueous solution of the following composition was prepared:

| Tin methanesulfonate | 20 g/l (as divalent tin) |
|---|---|
| Silver methanesulfonate | 10 g/l (as silver) |
| Tris(3-hydroxypropyl) phosphine | 208 g/l |
| Methanesulfonic acid (free acid) | 100 g/l |

With this aqueous solution, electroplating of a silver-tin alloy was performed on a copper sheet under the following conditions, and a good, bright silver-tin alloy plate was obtained. Semiquantitative fluorescent X-ray analysis showed that the plate contained about 60 wt % silver:

| Temperature | 25° C. |
|---|---|
| Current density | 2 A/dm$^2$ |

EXAMPLE 7

Silver-palladium electroplating

An aqueous solution of the following composition was prepared:

| | |
|---|---|
| Palladium chloride | 6 g/l |
| Glycine | 75 g/l |
| Silver nitrate | 2 g/l (as silver) |
| Tris(3-hydroxypropyl) phosphine | 160 g/l |

With this aqueous solution, a silver-palladium alloy was electroplated on a copper sheet under the following conditions, and a good silvery silver-palladium alloy plate was obtained. The presence of both metals, silver and palladium, was confirmed by EDAX:

| | |
|---|---|
| pH | 9 |
| Current density | 1 A/dm$^2$ |

EXAMPLE 8

An aqueous solution of the following composition was prepared:

| | |
|---|---|
| Tin 2-hydroxypropanesulfonate | 20 g/l (as divalent tin) |
| Copper methanesulfonate | 10 g/l (as copper) |
| Tris(3-hydroxypropyl) phosphine | 200 g/l |
| Methanesulfonic acid | 100 g/l |

With this aqueous solution, electroplating of a copper-tin alloy was conducted on a copper sheet under the following conditions, and a good copper-tin alloy plate was obtained. Semiquantitative fluorescent X-ray analysis showed that the plate contained about 70 wt % copper:

| | |
|---|---|
| Temperature | 30° C. |
| Current density | 1 A/dm$^2$ |

EXAMPLE 9

An aqueous solution of the following composition was prepared:

| | |
|---|---|
| Palladium chloride | 1 g/l |
| Tris(3-hydroxypropyl) phosphine | 20 g/l |

With this aqueous solution, electroless palladium plating was carried out over a nickel electroplated copper sheet, under the following conditions, and a good palladium plate was obtained:

| | |
|---|---|
| pH | 7 |
| Temperature | 50° C. |

EXAMPLE 10

An aqueous solution of the following composition was prepared:

| | |
|---|---|
| Tris(hydroxymethyl) phosphine-rhodium complex solution | 1 g/l (as rhodium) |

This aqueous solution was used as a simulated waste liquid, and electrolysis was performed with graphite as anode and copper sheet as cathode, through potential control to −0.4 V (vs. SCE), under the following conditions:

| | |
|---|---|
| pH | 2 |
| Temperature | room temp. |

A gray precipitate resulted. Fluorescent X-ray analysis showed that it contained rhodium, and it was confirmed that the rhodium could be electrolytically recovered from the aqueous solution.

EXAMPLE 11

An aqueous solution of the following composition was prepared:

| | |
|---|---|
| Tris(3-hydroxypropyl) phosphine-platinum complex solution | 2 g/l (as platinum) |
| Tris(3-hydroxypropyl) phosphine | 15 g/l |
| Hydrazine hydrate | 2 ml/l |
| Hydroxylamine hydrochloride | 0.1 g/l |

Using this aqueous solution, electroless platinum plating was carried out over an electroplated nickel coating on a copper sheet, under the following conditions, and a good platinum plate was obtained:

| | |
|---|---|
| pH (adjusted with ammonia water) | 11 |
| Temperature | 60° C. |

EXAMPLE 12

An aqueous solution of the following composition was prepared:

| | |
|---|---|
| Palladium chloride | 6 g/l |
| Glycine | 75 g/l |
| Indium sulfamate | 2 g/l (as indium) |
| Tris(3-hydroxypropyl) phosphine | 160 g/l |

Using this aqueous solution a copper sheet was electroplated with a palladium-indium alloy under the following conditions, and a good, silvery palladium-indium alloy plate was obtained. The presence of both palladium and indium in the coating was confirmed by EDAX.

| | |
|---|---|
| pH | 9 |
| Current density | 1 A/dm² |

EXAMPLE 13

An aqueous solution of the following composition was prepared:

| | |
|---|---|
| Tin methanesulfonate | 25 g/l (as tin) |
| Silver methanesulfonate | 0.6 g/l (as silver) |
| Methanesulfonic acid | 70 g/l |
| Tris(3-hydroxypropyl) phosphine | 21 g/l |
| Trimethyl thiourea | 7 g/l |
| 2-Mercaptobenzothiazole cyclohexylamine salt | 0.1 g/l |
| "Noigen EN" (phonetic) (Dai-ichi Kogyo Seiyaku Co.) | 1 g/l |
| "Texnol R-5" (phonetic) (Japan Emulsifiers Co.) | 1 g/l |
| Hydroquinone | 1 g/l |

Using this aqueous solution and under the following conditions a copper sheet was electroplated with a tin-silver alloy, and a good tin-silver alloy plate was obtained. Semi-quantitative fluorescent X-ray analysis showed that the plate had a silver content of about 7%.

| | |
|---|---|
| Temperature | 25° C. |
| Current density | 5 A/dm² |

What is claimed is:

1. An aqueous solution for the reductive deposition of metals comprising, besides water, (A) a phosphine of the general formula (1)

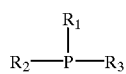

(1)

in which $R_1$, $R_2$, and $R_3$ denote lower alkyl groups, at least one of which being hydroxy- or amino-substituted lower alkyl group, and (B) a soluble compound of a metal or a compound of a metal solubilized through the formation of a soluble complex by said phosphine.

2. The aqueous solution according to claim 1 wherein the phosphine of the general formula (1) is tris(3-hydroxypropyl)phosphine.

3. The aqueous solution according to claim 1 wherein the metal is one or two or more metals selected from the group consisting of copper, silver, gold, zinc, cadmium, indium, germanium, tin, lead, arsenic, antimony, bismuth, chromium, molybdenum, manganese, iron, cobalt, nickel, ruthenium, rhodium, palladium, osmium, iridium, and platinum.

4. The aqueous solution according to claim 1 which further comprises one or more compounds containing phosphorus, boron, or tungsten.

5. The aqueous solution according to claim 1 which further comprises one or more reducing agents.

6. The aqueous solution according to claim 1 wherein the reducing agent is selected from the group consisting of borohydride, dimethylamine borane, trimethylamine borane, hydrazine boron, hydrazine, hydroxylamine, phosphinic acid, thiourea, formaldehyde, formic acid, glyoxylic acid, glyoxal, glucose, sorbitol, dextrin, tartaric acid, ascorbic acid, trivalent titanium ion, divalent cobalt ion, salts thereof and mixtures thereof.

7. The aqueous solution according to claim 1 which further comprises one or more components selected from the group consisting of surface active agent, semi-brightener, smoothing agent, brightener, stabilizing auxiliary complexing agent, masking complexing agent, pH buffer, conductive salts, and antioxidants.

8. The aqueous solution according to claim 1 which is used for electroplating or electroless plating.

9. The aqueous solution according to claim 1 which is used for the manufacture of fine metal particles or for the recovery of a metal or metals.

10. The coating or particles of a metal or an alloy which is obtained by using the aqueous solution according to claim 1.

11. An aqueous solution which is added as a supplement to the solution according to claim 1 and which comprises at least, besides water, (A) a phosphine of the general formula (1)

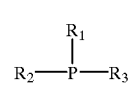

(1)

in which $R_1$, $R_2$, and $R_3$ each denotes a lower alkyl group, at least one of $R_1$, $R_2$, and $R_3$ being a hydroxy- or amino-substituted lower alkyl group, and (B) an antioxidant.

12. The aqueous solution according to the claim 11 wherein the antioxidant is selected alone or in combination from monohydric-, dihydric- and trihydric phenols in which a hydrogen atom or atoms on the benzene ring may be unsubstituted or substituted by —COOH, —SO₃H, lower-alkyl and/or lower-alkoxy groups.

* * * * *